United States Patent
Bridgeman

[15] 3,684,276
[45] Aug. 15, 1972

[54] FILM PICKUP SYSTEM
[72] Inventor: Cecil K. Bridgeman, Islington, Ontario, Canada
[73] Assignee: Picker X-Ray Mfg. Limited, Bramalea, Ontario, Canada
[22] Filed: Nov. 27, 1970
[21] Appl. No.: 93,381

[52] U.S. Cl. .................................. 271/20, 271/26
[51] Int. Cl. ............................................ B65h 3/48
[58] Field of Search ................ 271/26, 30, 19, 20, 24

[56] References Cited

UNITED STATES PATENTS 2,384,021  9/1945  Federwitz et al. ........ 271/30 R
3,275,317  9/1966  Fromm .................... 271/26 R Primary Examiner—Joseph Wegbreit
Attorney—Watts, Hoffmann, Fisher & Heinke

[57]  ABSTRACT

An x-ray apparatus is disclosed in which a sheet of film is selected for exposure, advanced to an exposure station from a film supply magazine and, after exposure, is transported to an exposed film magazine. A film pickup system removes a sheet of film from a stack of sheets in the supply magazine and comprises a sheet supporting assembly and an actuator for moving a sheet on one side of the stack into engagement with part of the sheet supporting assembly. The stack is flexed relative to the sheet engaging the supporting assembly so that the sheet is readily separated and removed from the stack for exposure.

8 Claims, 7 Drawing Figures

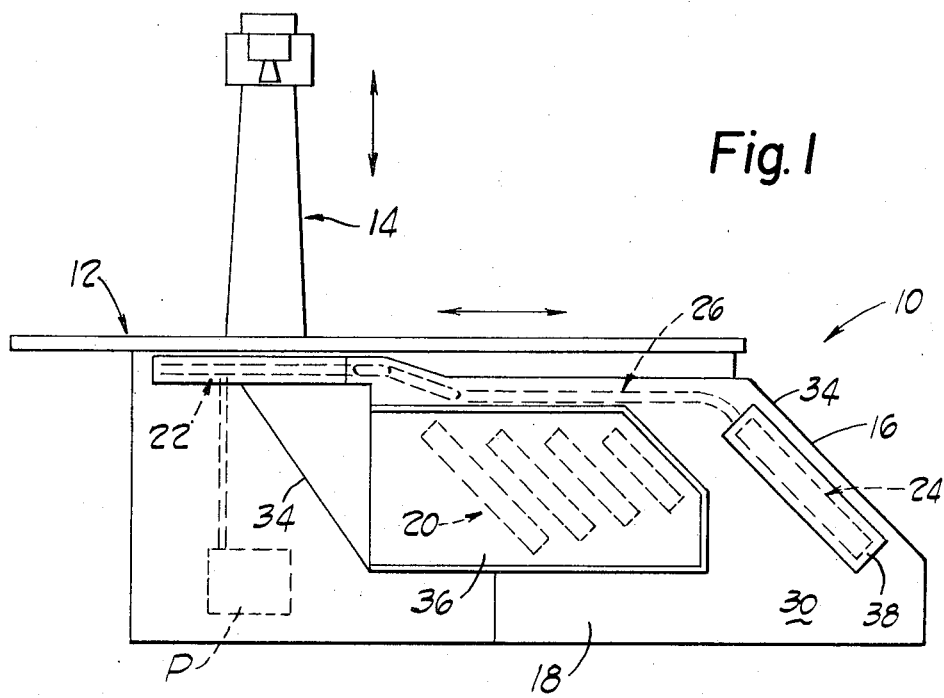
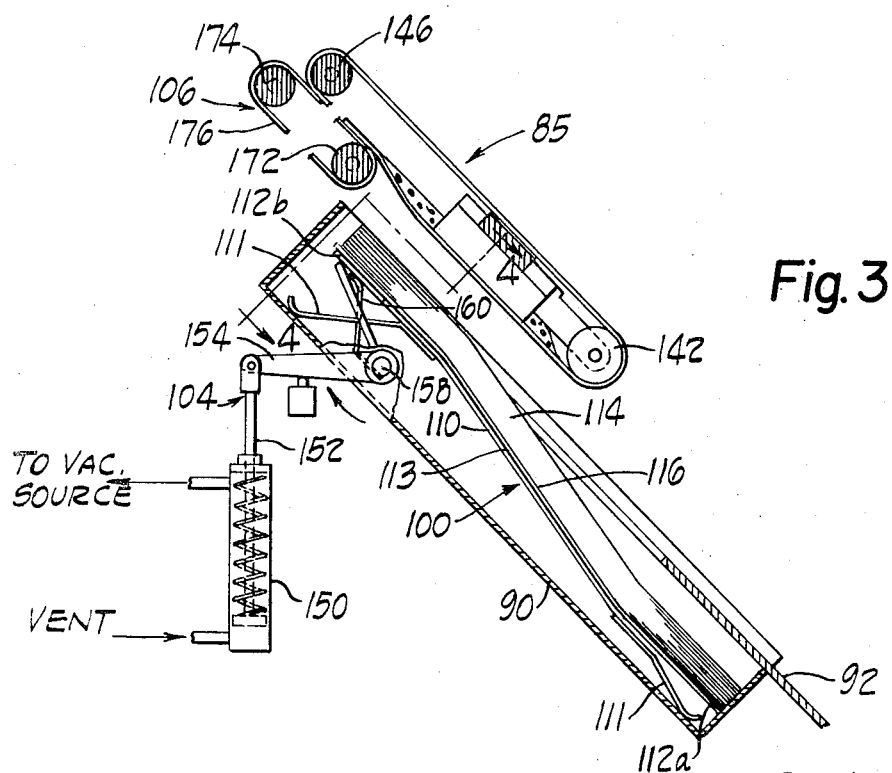

3,684,276

FILM PICKUP SYSTEM

CROSS REFERENCED PATENTS AND APPLICATIONS

Application for Letters Pat. Ser. No. 93,268 filed Nov. 30, 1970 by Cecil K. Bridgeman, title X-RAY TABLE.

BACKGROUND OF THE INVENTION

1. Field of the Invention

The present invention relates to X-ray apparatus utilizing individual film sheets for obtaining X-ray transparencies and more particularly relates to a film handling system associated with such an X-ray apparatus.

2. The Prior Art

Prior art medical X-ray apparatus for exposing X-ray film have employed cassettes which house the film to prevent it from being exposed by visible light and to assure that the film was adequately exposed by X-radiation impinging on the cassettes. The cassettes were light tight containers having image intensifier elements on either side of a sheet of film in the container. The image intensifier elements were sheet-like elements which fluoresced in response to X-radiation impinging on them. The visible light produced by the image intensifiers exposed the film.

The cassettes were loaded with unexposed film in a darkroom, sealed and then transported to storage in the vicinity of an X-ray apparatus for use. After exposure, the cassettes were returned to a darkroom where the cassette was opened, the exposed film removed and processed.

Typically, various sized and shaped cassettes have were used to house corresponding sized and shaped sheets of film. In a situation where large numbers of X-ray exposures are made, the supply of cassettes of various sizes must be quite large in order to assure the availability of desired film sizes and shapes.

Maintaining adequate stores of loaded cassettes of appropriately sized and shaped film sheets was a problem. Furthermore, loading and unloading cassettes was a tedious, time consuming procedure and transporting them from place to place was bothersome.

Some of the prior art proposed eliminating cassettes by the use of film handling apparatus housing a supply of sheets of film and which included a conveyor for moving sheets of film to an exposure location and which then conveyed the exposed film to a storage location.

Some prior art proposals of the general type referred to handled only a single size and shape of film sheet. To be versatile, these apparatuses had to use relatively large sheets of film. Relatively small area exposures resulted in wastage of film. Furthermore, some of these apparatuses were constructed in such a way that the unexposed film had to be loaded in darkness. Moreover, these proposals required a film conveyor system which extended through the exposure station. This complicated the exposure station and risked reducing the quality of the exposure.

One experimentally developed film handling system provided a film supply station having a plurality of film supply magazines each accommodating a stack of film sheets with each stack being of a different size from the others. The supply magazines were individually removable so that they could be taken to a darkroom filled with unexposed film and returned to the machine without danger of exposing the film. This machine also had a collection magazine for exposed film sheets of all sizes. The collection magazine was removable and formed a light tight container in which the exposed film sheets were transported to a darkroom. This experimental machine thus completely eliminated the use of cassettes while providing an extremely simple and effective way of handling the exposed and unexposed film sheets employed with the X-ray apparatus.

Although the experimental film handling apparatus provided significant improvements over the prior art, it was recognized that the apparatus might not become a commercial success unless a single sheet of film of a desired size was reliably removed from its supply magazine each time such a sheet of film was required for an exposure. If multiple film sheets were removed from a magazine and exposed all at once, the resulting X-ray transparencies would not be usable and the patient would have to be X-rayed again. Alternatively, if a sheet of film was "missed," i.e. a film sheet was not conveyed to the exposure station, the patient could be exposed to X-rays with no film in the exposure station. The patient would have to be X-rayed again.

One experimental film pickup construction utilized driven rollers for engaging a bottom sheet of a stack of film sheets. The rollers stripped sheets of film from the stack one at a time and propelled the sheets into a film transport system for movement to the exposure station. While this pickup system was successfully operated in experiments, there were questions concerning its reliability and consistency of operation over the life of the apparatus.

It was found that the nature of the film itself was a principal impediment to reliable and consistent removal of single film sheets from the magazines. Among the characteristics of the film which contributed to the problem were: the weight and bulk of stacks of the film; the relatively great weight of individual sheets of the film causing relatively abrupt and significant changes in stack weights as film sheets were removed from a stack; the relative smoothness of the film which made it difficult to grasp the film for transporting it; and the tendency for sheets of the film to cling together making removal of a single sheet from a stack of film and/or separation of a pair of engaged sheets of film difficult.

SUMMARY OF THE INVENTION

The present invention provides a new and improved film pickup system for removing sheets of film one at a time from a stack of film sheets in a film handling apparatus associated with an X-ray device. The new film pickup system insures that one sheet of film is picked up from a selected stack of film sheets when required. The construction of the new system also minimizes the possibility of picking up multiple sheets of the film. The new film pickup system forwards the single sheet to a film transport system which conveys the film to an exposure station and thereafter a collection station in the apparatus.

In a preferred embodiment of the invention, a film handling system for an X-ray apparatus includes a light tight body supporting a film supply station, a film exposure station, an exposed film collection station and a film transport system arranged to deliver film from the supply station to the exposure station and thereafter to the exposed film collection station. The supply station comprises a number of magazines each providing a receptacle for a stack of X-ray film sheets and with each of the film sheets of each stack being of a different size from the sheets in the other stacks.

Each receptacle includes a film sheet stack supporting structure which supports the stack for movement relative to the receptacle. The stack supporting structure preferably includes weight compensating springs which maintain the stack position generally uniform with respect to the receptacle as the weight of the stack is reduced due to removal of sheets from it. The stack supporting structure maintains the stack in a storage configuration, or shape, while the stack of film is in the receptacle.

A single sheet film supporting structure is located adjacent the receptacle. In the preferred construction, the single sheet supporting structure defines contact areas for engagement with a film sheet at one side of the stack. These areas can support that sheet separate from the stack. The single sheet support structure additionally includes at least a conveyor for moving a single sheet of film separated from the stack to the film transport system.

An actuator arrangement is associated with the stack supporting structure to enable movement of the stack relative to the receptacle for engaging the sheet of film on one side of the stack with the single sheet supporting structure. The actuator cooperates with the stack supporting structure so that the stack is flexed away from its storage configuration as the sheet on one side of the stack is engaged with the single sheet support structure. When the single sheet of film is firmly supported on the locations, the stack is permitted to flex back to its storage configuration. This flexure tends to separate the sheet on the single sheet supporting structure from the remaining sheets in the stack. When the stack is returned to its storage configuration, the single sheet which has remained on a single sheet support structure is fed into the film transport system.

In order to further assure that multiple sheets of film are not picked up, blowers are provided for directing streams of air onto the edges of the stack at locations where the stack engages the single sheet film support. The air stream separates the film sheets and particularly separates the film sheet at one side of the stack from the adjacent sheet so that the film sheet adjacent the single sheet is readily flexed back to its storage configuration with the remaining sheets of the stack. The air stream blows between the single sheet and the adjacent sheet to aid their separation.

The single sheet support structure is preferably constructed to produce an attractive force urging the film sheet into contact with it. Preferably this force is due to a pressure differential across the single film sheet. A control system is associated with the actuator and includes a pressure sensing device for maintaining the actuator in a condition for urging the stack against the single sheet film support until the pressure sensitive device detects the establishment of pressure differential across the single sheet. When the engagement between the single sheet and the film support structure is sensed, the actuator is deactuated allowing the film stack to return to its storage configuration. When the stack returns to its storage configuration, the single sheet is advanced to the film transport system.

A principal object of the present invention is the provision of a new and improved film pickup system for an X-ray apparatus which reliably removes a single sheet of film from one of a plurality of stacks of film in a supply station so that the single sheet of film can be advanced to an X-ray exposure station.

Other objects and advantages of the invention will become apparent from the following detailed description made with reference to the accompanying drawings which form a part of the specification.

BRIEF DESCRIPTION OF THE DRAWINGS

FIG. 1 is a front elevational view of an X-ray apparatus embodying the invention;

FIG. 3 is a fragmentary view of a portion of the apparatus shown in FIG. 2;

DETAILED DESCRIPTION OF A PREFERRED EMBODIMENT

Figure 2:
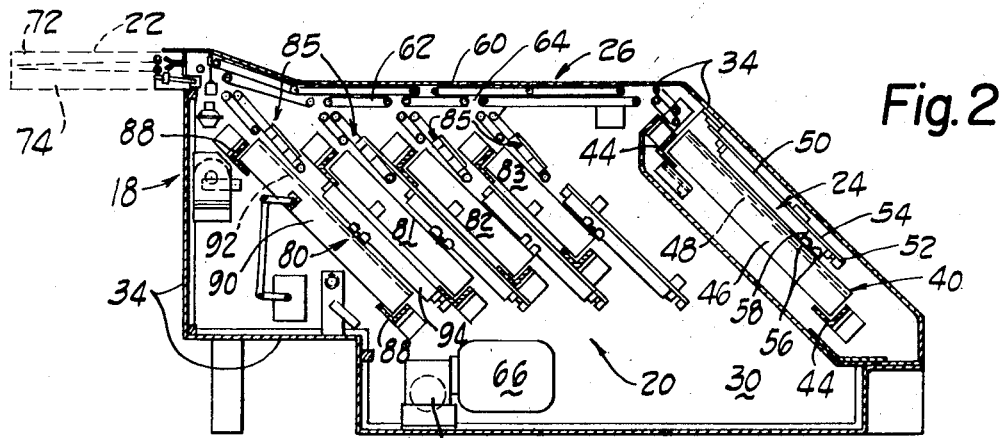
FIG. 2 is a cross sectional view of a portion of the apparatus illustrated in FIG. 1 and shown on a scale which is larger than the scale of FIG. 1.

An X-ray apparatus 10 embodying the present invention is illustrated in FIG. 1. The apparatus 10 comprises a patient manipulating table 12, an X-ray tube mount assembly 14 extending upwardly above the table 12 and a film handling system 16 disposed below the table. The patient manipulating table 12 and the X-ray tube mount assembly 14 may be of any suitable construction and therefore are illustrated schematically and are not described in detail.

The film handling system 16 includes a light tight body 18 which encloses a film supply station 20, a film exposure station 22 below the table, an exposed film collection station 24 and a film transport system 26 for delivering film sheets from the supply station 20 to the exposure station 22 and thereafter for transporting exposed film sheets to the collection station.

The body 18 is comprised of parallel upstanding plates defining side frames 30 which form the structural supports for the film supply station 20, the exposure station 22, the collection station 24 and the film transport system 26. Top, end and bottom closure plates 34 extend between the side frames 30 so that the interior of the body 18 is a light tight enclosure. Access doors 36, 38 are connected to one side frame 30. The access doors can be opened to enable removal and/or replacement of film from the collection and supply stations as is described in greater detail below.

The exposed film collection station 24 provides a receptacle in which exposed film sheets are collected within the body 18 and which receptacle is removable from the body for periodic transport to a darkroom for processing the film. Referring now to FIG. 2, the collection station includes a collection magazine assembly 40 including a drawer assembly which is supported on slides 44 formed by angle irons which extend between the side frames. The drawer assembly includes a rectangular drawer body 46 defining a film receiving volume and a closure member 48 which is slidable between opened and closed positions over the open side of the drawer body 46. When the closure member 48 is in its closed position, the drawer body 46 is closed and light tight so that the drawer can be removed from the body 18 for transporting film without risk of exposing the film during transport.

The closure member 48 is operated between its opened and closed positions by an actuator 50. The actuator 50 is preferably of the piston and cylinder single acting type. The actuator includes a spring, (not shown) which urges the piston to a position in which the closure member 48 is in its open position. The actuator 50 is communicable with a vacuum source or pump P (FIG. 1) so that the piston member is moved against the spring force to close the drawer body 46.

The actuator piston rod 52 carries a bracket 54 which reciprocates with the piston rod. A pair of fingers 56 are mounted on a bracket 54 and extend from the bracket on either side of a knob 58 which projects from the closure member 48. The ends of the fingers 56 extend towards the access door 38 so that the closure member 48 is forced to reciprocate with the piston rod 52 yet when the drawer assembly 42 is closed, the knob 58 can slide from between the fingers 56 as the drawer assembly is removed from the body 18 through the access door 38.

The film transport system 26 delivers film sheets one at a time from the supply magazine to the exposure station and thereafter to the collection station along a film path of travel. The transport system 26 includes an upper conveyor 60 and a lower conveyor 62. The conveyors 60, 62 are each comprised of a series of belt drive units having parallel belts with belts of the upper unit having reaches which confront reaches of belts of the lower units. The confronting belt reaches engage a sheet of film and move the film along a film path of travel 64 between the conveyors.

A reversible electric motor 66 drives the conveyors 60, 62 through a gear reduction 68 and a chain drive not shown. The conveyor belts are supported by shafts having opposite ends which are journalled in the side frames 30 and extend transverse to the path of travel. There is one drive shaft and one or more idler shafts for each belt drive unit. The driving shafts carry chain engaging sprockets which are outside of the body 18. Driving chains are reaved about these sprockets. The motor 66 is reversible so that the belt drive units can move a sheet of film along the film path of travel 64 towards the exposure station and thereafter move the film sheet away from the exposure station towards the collection magazine assembly in an opposite direction along the path 64.

Selected sheets of film are fed to the exposure station one at a time for exposure by X-rays passing through a patient on the table 12. The exposure station 22 preferably comprises a pair of film support frames 72, 74 each of which carries a sheet-like image intensifier element. The upper frame member 72 is elevated away from the lower frame member 74 for reception of a sheet of film between them after which the member 72 is lowered onto the member 74 to establish intimate contact between the film and the image intensifiers.

In the preferred embodiment, the space between the support frames 72, 74 is exposed to the vacuum source (not illustrated in FIG. 2) so that the space is evacuated to assure intimate contact between the image intensifiers and the film. X-rays passing through the frame members 72, 74 cause the image intensifier elements to fluoresce and aid in exposing the film. The X-rays themselves expose the film to some extent. After the exposure, the space between the support frames is vented to atmospheric pressure. The support frame 72 is lifted and the exposed film is withdrawn from the exposure station by the film transport system.

A more complete description of an exposure station of the general type referred to can be found in the above-referenced copending application to Bridgeman.

The film supply station 20 separately stores stacks of four different sized film sheets which sheets are selectively removed one at a time from the supply station and fed to the exposure station. The supply station 20 includes four film magazine assemblies 80–83 and four film pickup systems 85, each associated with a respective film magazine assembly.

The film supply magazines provide portable storage receptacles for unexposed film sheets which can be loaded with film in a darkroom remote from the apparatus closed in a light tight fashion and inserted into the apparatus. The film magazine assemblies and the associated pickup systems are each of substantially the same function and construction and accordingly only one magazine assembly and its associated pickup system is described in detail.

Referring to FIG. 2, film magazine assembly 80 comprises a storage drawer assembly which is mounted on slides 88 formed by angle irons which are supported between the housing side frames 30. The drawer assembly includes a rectangular drawer body 90 having an open side and a closure member 92 which is slidable back and forth across the open side of the drawer between an open position in which film can be moved into or out of the drawer and a closed position in which the drawer is closed in a light tight fashion.

A closure actuator assembly 94 moves the closure member between its positions. The actuator 94 includes movable parts engaging a knob carried by the closure 92 so that the closure member 92 is moved back and forth between its open and closed positions on the drawer body. The actuator assembly 94 is constructed the same as the actuator 50 described above in reference to the collection magazine and reference should be made to that description for understanding the operation of the actuator 94.

Referring now to FIG. 3, the film pickup system 85 functions to remove a single sheet of film from the associated magazine assembly 80 and to convey the film sheet to the transport system. The film pickup system 85 includes a film stack support assembly 100 in the drawer 90, a single sheet supporting structure 102 connected between the side frames 30 and adjacent the open side of the drawer body 90, a film stack actuating system 104 for moving the film stack toward engagement with the sheet support structure 102, and a conveyor belt unit 106 for transporting a single sheet of film from the support assembly 102.

The film stack support assembly is disposed in the drawer 90 and supports the stack for movement relative to the drawer as well as for elevating the stack as film sheets are removed to compensate for the change in stack weight. The assembly 100 includes a plate 110 which is supported in the drawer by spring legs 111. The spring legs 111 have spring rates which elevate the plate 110 relative to the drawer so that the top sheet of the stack is always in substantially the same location as the number of sheets in the stack is dissipated.

The plate 110 has a pivot end 112a at the lower end wall of the drawer and a swing end 112b. The plate has an offset 113 between its ends so that the stack of film sheets 114 lies on the plate 110 in a storage configuration in which the stack is flexed over the offset 113 yet remains unflexed transverse to the offset.

Figure 4:
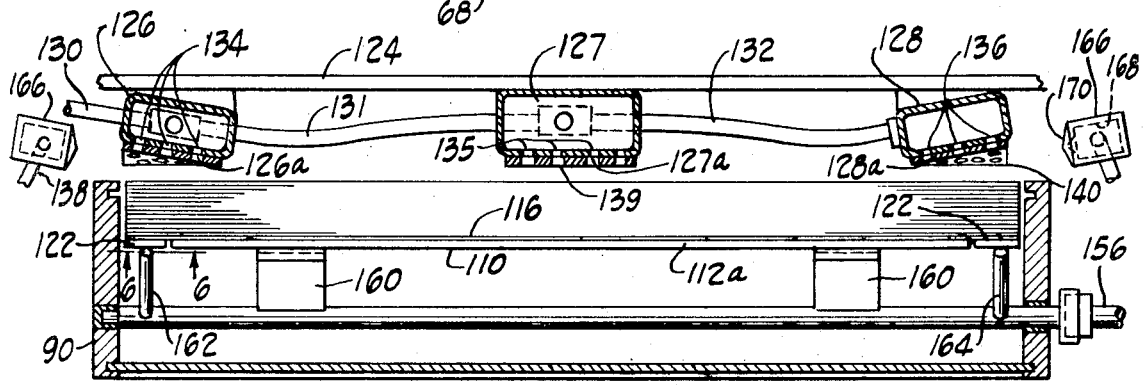
FIGS. 4 and 5 are cross sectional views seen from the plane indicated by the line 4—4 of FIG. 3 and showing the elements of FIG. 3 in different operative conditions.
Figure 5:
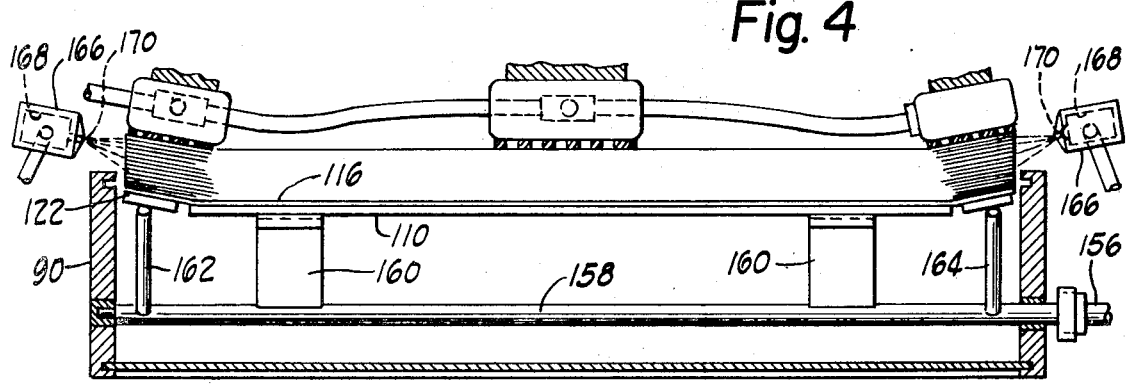
Figure 6:
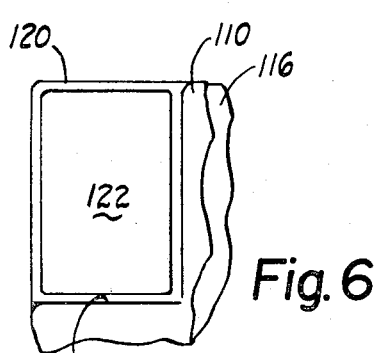
FIG. 6 is a cross sectional view seen approximately from the plane indicated by the line 6—6 of FIG. 4; and, FIG. 7 is a schematic illustration of the arrangement of components of a film pickup system embodying the invention.

The plate 110 is a rigid member and supports a flexible cover 116 which is adhered to the plate 110 on its upwardly facing side. The cover 116 is a rectangular element and can be a sheet of film or film-like material having the same overall dimensions as the plate. As is shown in FIGS. 4–6, the corners of the plate 110 at the swing end 112b have rectangular notches or cutouts 118 formed in them so that the overlying corner areas 120 of the cover 116 is unsupported by the plate 110 at the corners of the swing end of the plate. The corner areas 120 of the cover 116 support rigid pads 122 which are permanently attached to the material of the cover 116 by a suitable adhesive. The pads 122 and the corner area 120 are movable relative to the plate 110 so that the corners of a stack of film sheets 114 overlying the pads 122 can be flexed as is described in greater detail below.

The single sheet support structure is constructed and arranged so that the top sheet of the stack 114 clings to it and for separation from the stack 114. The support assembly 102 includes a support bar 124 which is supported between the side frames 30 and which supports vacuum manifold members 126–128. Vacuum lines 130–132 interconnect the vacuum manifolds so that each manifold is at the same pressure as the others.

The three manifolds 126–128 are spaced apart over the stack of sheets 114 with the center manifold 127 having a downward face 127a which is in a plane generally parallel to the plane of the sheets of the stack when in their storage configuration. The manifold members 126 and 128 have downward faces 126a, 128a which lie in planes which create approximately a 10° angle with the plane of the sheets. Vacuum ports 134–136 are formed in the faces of the manifolds 126–128, respectively.

The single sheet support structure 102 defines three locations which are engageable with the top sheet of the stack 114 and which support the top sheet. These contact locations are defined by portions of perforate belts 138–140 which are trained across the faces of the vacuum manifolds 126,128, respectively. As is best seen in FIG. 3, the support bar 124 carries idler pulleys 142 (only one of which is illustrated), each associated with respective ones of the belts 138–140. The belts extend around the idler pulleys and around a single drive shaft 146 which is located above the manifolds 126–128. The drive shaft 146 is driven from the motor 66.

The stack actuating system 104 moves the top sheet of the stack into engagement with the single sheet support structure while flexing the stack so that when the stack returns to its unflexed storage configuration, the top sheet remains on the single sheet support structure 102. The actuating system 104 includes an actuator 150 which is preferably a single acting piston-cylinder type communicable with the vacuum source. A piston rod 152 of the actuator is connected at its end to a rock arm 154 which in turn is fixed to a rock shaft 156 (FIGS. 4 and 5) extending through a side frame of the housing. The rock shaft 156 drives a rock shaft 158 which extends through the drawer member 90 with the rock shafts 156, 158 connected by a suitable plug-in type connection which is operative to connect the shafts when the drawer 90 is slid into position.

The drawer mounted rock shaft 158 is journalled between sides of the drawer 90 and extends across the drawer below the plate 110. The shaft 158 carries spring arms 160 which are fixed to the shaft for rotation with it into engagement with the plate 110. Two spring arms 160 are shown but a single spring arm can be used if desired. The spring arms 160 are resiliently deflectible so that when the stack 114 engages the center manifold member 127 and the perforate belt 139 extending across it, further rotation of the rock shaft 158 results in deflection of the spring arms 160. This allows the rock shaft 158 to "overtravel" and the force applied by the springs 160 remains about constant. The springs 160 can thus be said to create a lost motion connection between the rock shaft 158 and the stack support plate.

Flexing of the film stack 114 is accomplished by a pair of rigid fingers 162, 164 which are fixed to the rock shaft 158 and are disposed on opposite sides of the springs 160. The fingers 162, 164 engage the steel pads 122 at the corners of the cover 116 so that the corners of the stack 114 are capable of upward flexure by the fingers 162, 164 and the rock shaft 158 is turned while the springs 160 deflect. The lost motion function of the springs 160 is clearly shown in FIGS. 4 and 5. FIG. 5 shows the stack 114 engaged with the central manifold 127 and with the rigid fingers 162 pressing on the pads 122 so that the corners of the stack are flexed upwardly and into face contact with the manifolds 126 and 128 and their belts 138, 140.

When the actuator 150 is vented a return spring 150a in the actuator urges the piston toward a venting port in the cylinder and the rock shaft 158 rotates the fingers and spring arms 160 away from engagement with the stack supporting structure 100. When this occurs, the sheets in the stack 114 tend to return to their storage configuration on the plate 110 in which the corners of the stack are unflexed. When this occurs, the pressure differential across the top sheet of the stack maintains the corners of this top sheet flexed and engaged with the manifold members and belts of the single sheet supporting structure 102.

To enhance the return of the film sheets to their storage configuration blowers, schematically illustrated at 166 in FIGS. 4 and 5, are disposed adjacent the manifold members 126 and 128. The blowers each include a manifold 168 having a nozzle 170 for directing a stream of air onto the edges of the sheets. The air flow is of relatively low velocity but is sufficient to aid in separating the top sheet of the stack from an adjacent sheet as the fingers 162, 164 move out of engagement with the pads 122. The blowers are connected to a suitable source of positive air pressure, not illustrated.

After the top sheet is separated from the stack 114 it is fed to the transport system 26 by belt units of the pickup system. More particularly, the belt unit 106 and the belts 138-140 move the separated sheet into the film transport unit. The belt unit 106 includes shafts 172, 174 (FIG. 3) which extend between the side frames of the housing. Each of these shafts supports three belts 176 each of which is disposed so that its upper reach confronts the lower reaches of a respective one of the belts 138-140. When the separated sheet clings to the belts 138-140, the belts 138-140 are moved so that the sheet moves with these belts. The sheet is thus fed to the unit 106 and is gripped between the belts 176 and the belts 138-140 for feeding into the transport system.

Figure 7:
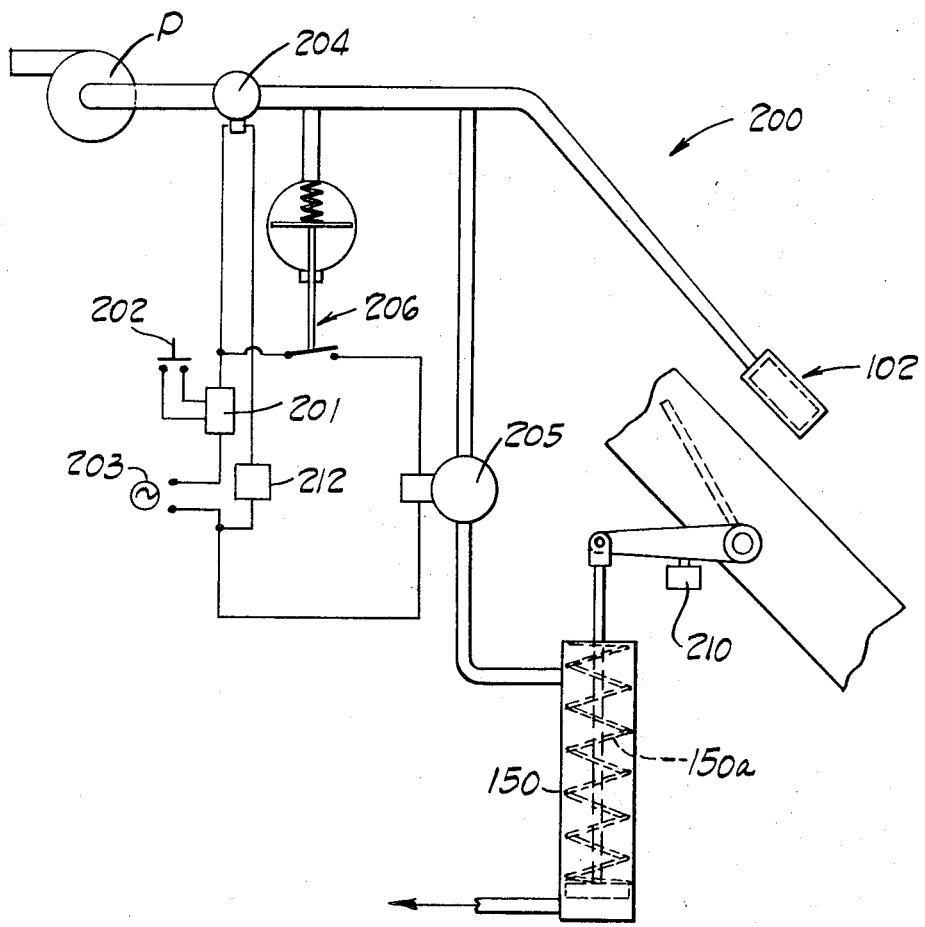

A control system governs operation of the pickup system 85 to minimize the possibility of a "miss;" i.e. to prevent the pickup system from failing to pick up a sheet. Referring now to FIG. 7, an example of such a control system 200 is schematically illustrated. The system 200 includes a push button control switch 202 which is connected to a suitable holding circuit 201, which in turn is connected across a power supply 203 in series with function controlling valves in the system. The push button switch is preferably a "Film Advance" button located on a control panel of the apparatus 10. When the operator wishes to advance film to the exposure station, the push button control switch 202 is closed momentarily. This opens an electrically energizable vacuum valve 204 which communicates the manifolds to the vacuum pump P. An electrically operated actuator control valve 205 is also energized to communicate the actuator 150 with the pump P so that the actuator 150 lifts the stack supporting structure 100 to engage the film stack with the single sheet support structure 102.

A pressure sensitive switch 206 communicates with the vacuum manifolds of the single sheet support structure 102 so that when the pressure in the manifolds 126-128 reaches a suitably low level, indicating that a sheet of film is firmly engaged with the sheet support structure 102, the switch 206 deactuates the valve 205. The piston of the actuator moves back to its deactuated position under the influence of the spring 150a. The actuator cylinder preferably vents relatively slowly so that the stack supporting structure 100 drops back into the drawer 90 relatively slowly. This gives the sheets of the stack 114 time to separate from the top sheet. When the actuator piston has moved back to its deactuated position, the arm 154 engages the arm of a limit switch 210 which initiates operation of the conveyor motor 66 so that the top sheet of the stack, which is now separated and supported on the structure 102, is moved into the film transport system.

The vacuum valve 204 can be deenergized and closed by subsequent machine functions to cut off communication between the manifolds 126-128 and the pump P. The valve 204 may alternately be closed by a timer which maintains the valve 204 open for a sufficiently long period of time that the separated sheet of the stack 114 is cleared from the sheet pickup unit 85. The means for deenergizing the valve 204 is schematically shown at 212.

While a single embodiment of the invention has been illustrated and described herein in considerable detail, the invention is not to be considered limited to the precise construction shown. It is the intention to cover hereby all adaptations, modifications and uses of the present invention which come within the scope of the appended claims.

What is claimed is:

1. In an X-ray mechanism, an apparatus for handling sheets of film which are moved one at a time from a film supply station to an exposure station comprising:
    a. film storage means including structure defining a storage volume for a stack of film sheets;
    b. film sheet support means for supporting a single sheet of film apart from said stack;
    c. film stack support means for supporting a stack of film sheets in a storage configuration;
    d. actuator means for flexing a stack of film sheets from said storage configuration to a configuration in which a single sheet at one side of a stack engages said sheet support means and for enabling a stack to return to its storage configuration;
    e. said film sheet support means maintaining a single sheet from one side of a stack in the flexed configuration after remaining sheets in a stack have returned to the storage configuration; and,
    f. film sheet advancing means for moving a film sheet supported by said film sheet supporting means away from said supply station.

2. The apparatus claimed in claim 1 wherein said film stack supporting means comprises a first rigid member supporting a stack in the storage configuration and a second flexible member associated with said first member adjacent a location of a stack, said actuator means engaging said first and second members of said stack supporting means and moving said second member relative to said first member to flex a stack from the storage configuration.

3. Apparatus as claimed in claim 2 wherein said actuator means comprises a force transmitting member, a lost motion force applying member disposed between said first stack supporting member and said force transmitting member, and at least a rigid force applying member disposed between said second stack supporting member and said force transmitting member, said force transmitting member moving to move said force applying members and actuate said stack supporting means, said rigid force applying member moving relative to said lost motion force applying member to effect flexing of said stack.

4. The apparatus claimed in claim 1 wherein said film sheet support means defines sheet contact locations on which a single sheet of film is supported when said actuator is operative, said sheet supporting means comprising holding means for establishing a force urging a single sheet into engagement with said sheet supporting locations to maintain the sheet in position when the stack is in its storage configuration.

5. The apparatus claimed in claim 4 wherein said holding means comprises a vacuum source communicating with said sheet supporting locations for establishing a differential pressure force on a sheet engaging said location.

6. The apparatus claimed in claim 5 further including at least a conveyor having a portion located at least at one sheet contact location.

7. In an X-ray apparatus comprising a film handling system for storing cut sheets of film and for transporting sheets of the film one at a time to an exposure station:
   a. a film storage means including structure defining a storage volume for a stack of film sheets;
   b. film sheet supporting means defining at least two film sheet engaging locations on which a single sheet of film is supportable;
   c. stack supporting means for supporting the stack of film sheets;
   d. actuating means cooperating with said stack supporting means for effecting engagement between a sheet of film on one side of a stack with said locations;
   e. said actuating means comprising movable members for flexing the stack of film sheets relative to a sheet of film engaging said locations to separate the sheet of film from the stack of film sheets; and,
   f. sheet conveyor means for moving a sheet of film from said locations.

8. A method of separating a single sheet of film from a stack of film sheets comprising:
   a. supporting a stack of film sheets;
   b. stationing a film sheet supporting means adjacent the stack;
   c. moving the stack relative to the film sheet supporting means to engage a single sheet on one side of the stack with the supporting means;
   d. establishing a holding force between the single sheet and the supporting means;
   e. flexing the stack of film sheets away from the single sheet to produce relative movement between the single film sheet and an adjacent film sheet of the stack; and,
   f. separating the single film sheet from the adjacent film sheet while maintaining the single sheet supported on the sheet supporting means.

* * * * *